(12) United States Patent
Roeck et al.

(10) Patent No.: US 7,627,728 B1
(45) Date of Patent: Dec. 1, 2009

(54) SYSTEM AND METHOD FOR EFFICIENT GENERATION OF APPLICATION SNAPSHOTS

(75) Inventors: Guenter E. Roeck, San Jose, CA (US); Sameer Lokray, Sunnyvale, CA (US)

(73) Assignee: Symantec Operating Corporation, Cupertino, CA (US)

( * ) Notice: Subject to any disclaimer, the term of this patent is extended or adjusted under 35 U.S.C. 154(b) by 419 days.

(21) Appl. No.: 11/321,459

(22) Filed: Dec. 29, 2005

(51) Int. Cl.
G06F 12/16 (2006.01)
G06F 11/00 (2006.01)

(52) U.S. Cl. .......................... 711/162; 711/163; 714/15
(58) Field of Classification Search .............. 711/162, 711/163, 205, 207; 714/16, 15
See application file for complete search history.

(56) References Cited

U.S. PATENT DOCUMENTS

| | | | |
|---|---|---|---|
| 6,101,524 A | 8/2000 | Choi | |
| 6,622,263 B1 * | 9/2003 | Stiffler et al. | 714/13 |
| 6,718,538 B1 * | 4/2004 | Mathiske | 717/129 |
| 6,848,106 B1 | 1/2005 | Hipp | |
| 6,850,945 B2 | 2/2005 | Lanzatella | |
| 7,093,086 B1 * | 8/2006 | van Rietschote | 711/161 |
| 7,251,745 B2 | 7/2007 | Koch | |
| 2002/0091718 A1 * | 7/2002 | Bohannon et al. | 707/202 |
| 2002/0174265 A1 * | 11/2002 | Schmidt | 709/328 |
| 2004/0117580 A1 * | 6/2004 | Wu et al. | 711/170 |
| 2007/0180217 A1 * | 8/2007 | Raymond et al. | 711/203 |

OTHER PUBLICATIONS

Yang et al., "User-Level Implemented Checkpointing for Multithreaded Applications on Windows NT," IEEE, 2003.*

* cited by examiner

*Primary Examiner*—Shane M Thomas
(74) *Attorney, Agent, or Firm*—Meyertons Hood Kivlin Kowert & Goetzel, P.C.; B. Noël Kivlin (57) ABSTRACT

A system, method, and computer-accessible medium are disclosed for efficient generation of application snapshots. Execution of an application is stopped, wherein a plurality of memory pages are accessible to the application. By altering page permissions of the plurality of memory pages, a state of the plurality of memory pages is preserved while the execution of the application is stopped. The execution of the application may be restarted after the state of the plurality of memory pages has been preserved. The state of the plurality of memory pages may be captured after the execution of the application has been restarted.

20 Claims, 6 Drawing Sheets

SYSTEM AND METHOD FOR EFFICIENT GENERATION OF APPLICATION SNAPSHOTS

BACKGROUND

1. Field of the Invention

This invention relates to enterprise system management and, more particularly, to continuous availability techniques in multi-server networked environments.

2. Description of the Related Art

The impact of system downtime on productivity is increasing as organizations rely more heavily on information technology. Consequently, organizations may seem to minimize downtime through various approaches designed to increase reliability and availability. Ultimately, the goal of many organizations is to ensure the continuous availability of critical systems.

One approach to continuous availability is the use of redundant hardware executing redundant instances of an application in lockstep. If one instance of an application on one unit of hardware fails, then the instance on the other unit of hardware may continue to operate. However, the redundant hardware is often proprietary, and both the redundant and proprietary natures of the hardware yield a cost that may be prohibitive. To avoid the expense of special-purpose hardware, software techniques may be used to provide failover of an application. For example, cluster management software may support application failover in a networked environment having two or more servers and a shared storage device. If the failure of an application or its host server is sensed, then a new instance of the application may be started on a functioning server in the cluster. However, software-based failover approaches may fail to preserve the entire context of the application instance on the failed server up to the moment of failure. In the wake of a failure, the new instance of the application is typically started anew. In the process, recent transactions and events may be discarded. Other transactions and events may be left in an indeterminate state. The server or its clients may need to initiate new connections to replace connections lost in the failover.

Debugging software has used techniques for the logging and replay of events encountered by an application. For example, a debugger may log events occurring during execution of a first instance of an application. The debugger may then replay the logged events from the beginning by means of instrumentation of the application, typically using recompilation or other techniques prior to replay. However, recompilation may not be available for off-the-shelf application software, and static instrumentation may often yield an unacceptable performance penalty for software in a production environment. It is desirable to provide improved methods and systems for continuously available execution environments.

SUMMARY

A system, method, and computer-accessible medium are disclosed for efficient generation of application snapshots. In one embodiment, the method may include stopping execution of an application in order for an application snapshot to be generated. The application snapshot may comprise application state data such as the execution state, memory state, transaction state, open network connections, open files, and other suitable state-related data for the application instance at a particular point in time. The memory accessible to the application may comprise a plurality of memory pages, each with page permissions.

The method may further include preserving the state of the memory pages while the execution of the application is stopped by altering the page permissions of the memory pages. The page permissions may comprise read-only permissions, copy-on-write permissions, and/or other suitable flags or settings to preserve a snapshot of the relevant memory at a point in time while the application is frozen. The method may then include restarting the execution of the application after the state of the memory pages has been preserved. In this way, disruption of the application may be minimized. Finally, the method may include capturing the state of the memory pages after the execution of the application has been restarted. Due to the earlier alteration of the page permissions, the captured memory state may reflect the state of the memory while the application was stopped.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
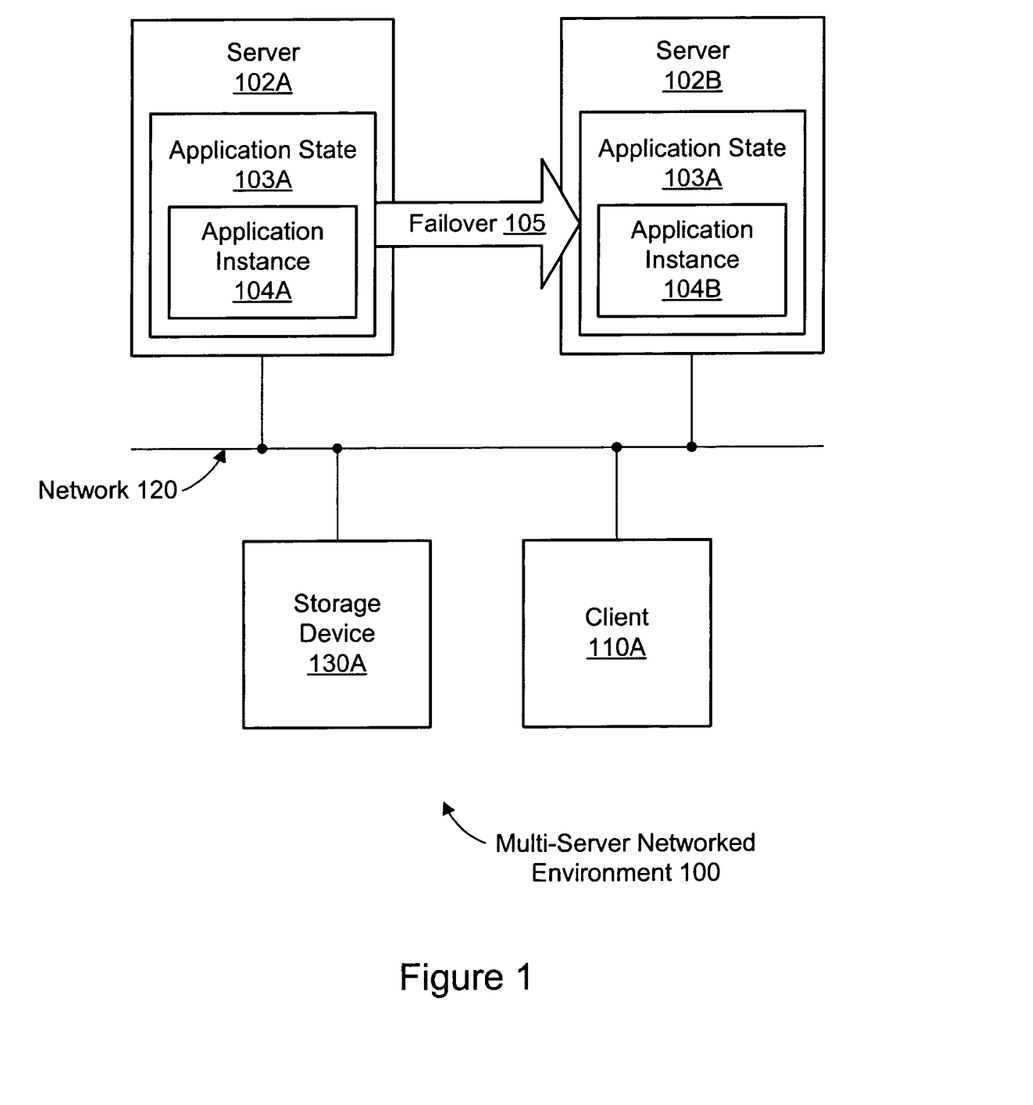
FIG. 1 illustrates a multi-server networked environment including failover according to one embodiment.
Figure 2:
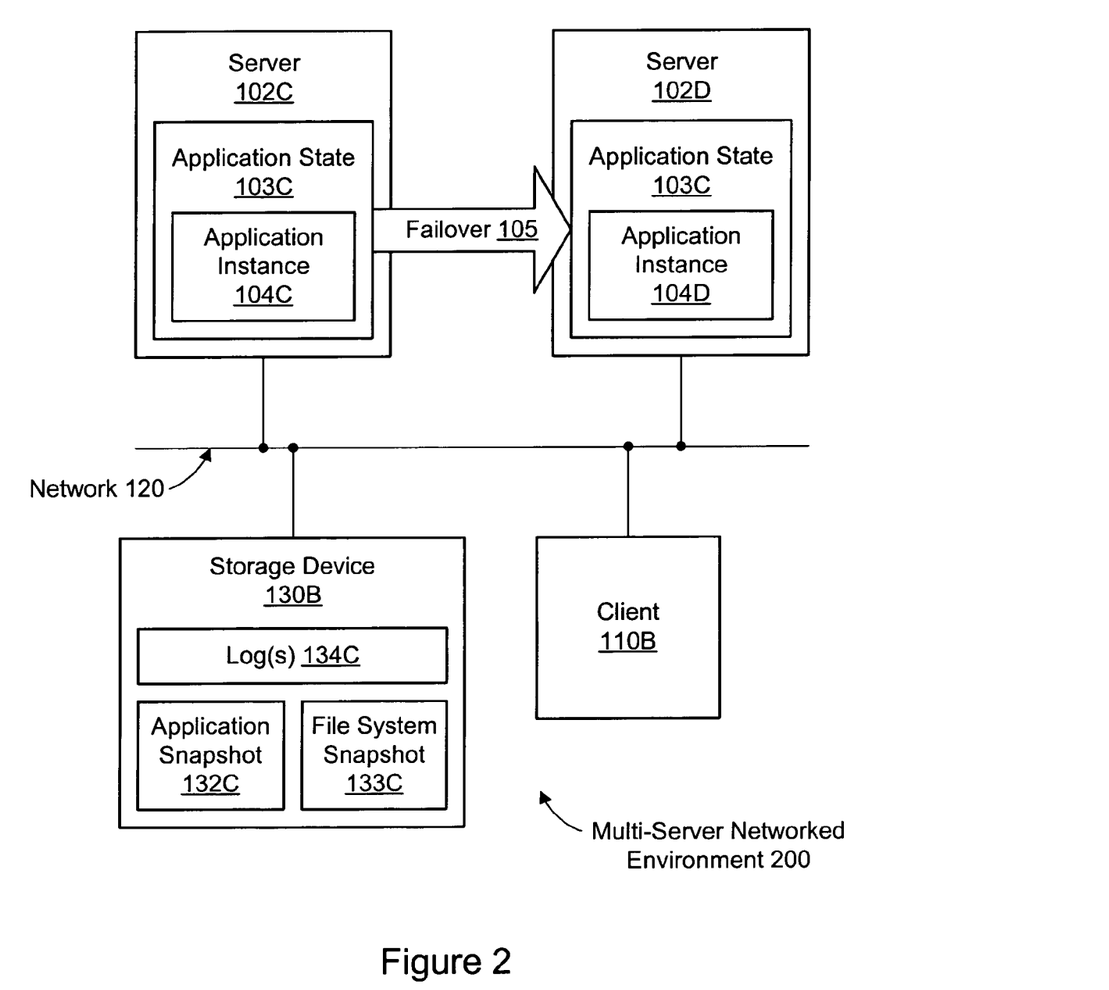
FIG. 2 illustrates a multi-server networked environment including failover based on capturing and restoring a file system snapshot, application snapshot, and log of events according to one embodiment.
Figure 4:
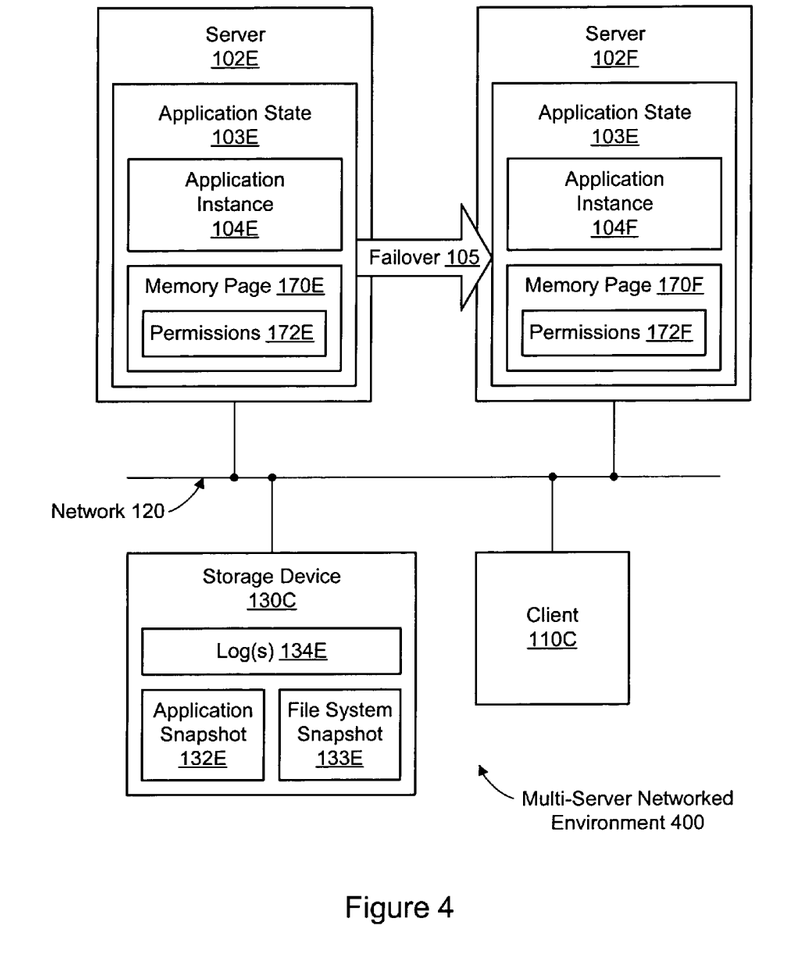
FIG. 4 illustrates a multi-server networked environment including efficient generation of application snapshots according to one embodiment.
Figure 6:
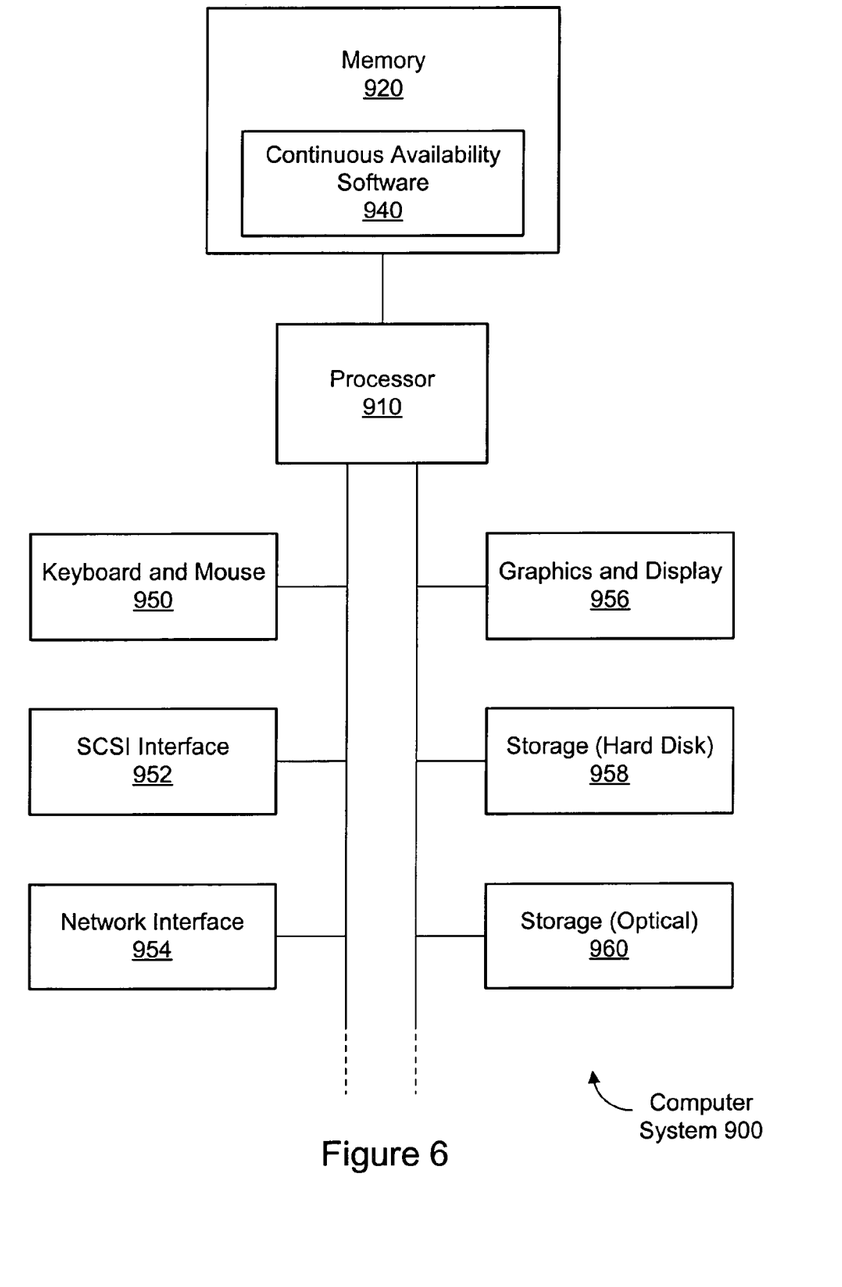
FIG. 6 illustrates a block diagram of a typical computer system for implementing embodiments of the systems and methods described above.

Using the systems, methods, and computer-accessible media described herein, efficient generation of application snapshots may be provided. Recurring application snapshots may be used to preserve the application state of a first instance of an application in such a way that interruption of the execution of the first instance is minimized. The application state may be deterministically restored to a second instance of the application using the most recent application snapshot. FIGS. 1, 2, and 4 illustrate examples of multi-server networked environments which may be used with the systems, methods, and computer-accessible media described herein. FIG. 6 illustrates an example of a computer environment which may be used with the systems, methods, and computer-accessible media described herein. The example configurations shown in FIGS. 1, 2, 4, and 6, and the quantity and kind of elements shown therein, are intended to be illustrative rather than limiting, and other embodiments are possible and contemplated. As used herein, the term "server(s)" or "servers(s) 102" may refer collectively to any of the servers 102A-102F illustrated in FIGS. 1, 2, and 4. Servers 102 may also be referred to herein as "hosts." As used herein, the term "client(s)" or "client(s) 10" may refer collectively to any of the clients 110A-110C illustrated in FIGS. 1, 2, and 4. As used herein, the term "storage device(s)" or "storage device(s) 130" may refer collectively to any of the storage devices 130A-130C illustrated in FIGS. 1, 2, and 4. As used herein, the term "application(s)" or "application(s) 104" may refer collectively to any of the application instances 104A-104F illustrated in FIGS. 1, 2, and 4. As used herein, the term "application state(s)" or "application state(s) 103" may refer collectively to any of the application states 103A, 103C, 103E illustrated in FIGS. 1, 2, and 4. As used herein, the term "multi-server networked environment(s)" may refer collectively to any of the multi-server networked environments 100, 200, 400 illustrated in FIGS. 1, 2, and 4. As used herein, the term "log(s)" or "log(s) 134" may refer collectively to any of the logs 134C and 134E illustrated in FIGS. 2 and 4. As used herein, the term "application snapshot(s)" or "application snapshot(s) 132" may refer collectively to any of the application snapshots 132C and 132E illustrated in FIGS. 2 and 4. As used herein, the term "file system snapshot(s)" or "file system snapshot(s) 133" may refer collectively to any of the file system snapshots 133C and 133E illustrated in FIGS. 2 and 4. As used herein, the term "memory page(s)" or "memory page(s) 170" may refer collectively to any of the memory pages 170E and 170F illustrated in FIG. 4. As used herein, the term "permission(s)" or "permission(s) 172" may refer collectively to any of the page permissions 172E and 172F illustrated in FIG. 4.

FIG. 1 illustrates a multi-server networked environment 100 including failover according to one embodiment. The multi-server networked environment 100 may be used to provide a continuously available execution environment including failover 105 for one or more applications 104. If one server 102A fails, the execution environment may be recreated on another server 102B such that the application state 103A immediately prior to the failure is duplicated. The application state 103A may include execution state, memory state, transaction state, open network connections, open files, and any other parameters and context necessary to resume execution of the application 104 in a deterministic manner. By duplicating the application state 103A of one application instance 104A to another application instance 104B using failover techniques 105, the application 104 may continue execution in a manner that is transparent to one or more clients 110. In addition to the failover scenario, the systems, methods, and computer-accessible media disclosed herein may also be used to perform a planned migration of an application from one server to another.

The continuously available execution environment may also be referred to as "software fault tolerance" or "application virtualization." In one embodiment, applications may be encapsulated in a virtual environment in which exchanges of data with the operating system and with other external processes are monitored. The virtual environment may include the virtualization of network addresses, process IDs, thread IDs, semaphore IDs, and other addresses and identifiers which link the application to external resources. In one embodiment, the continuously available execution environment may be implemented primarily in software, i.e., without using redundant propriety hardware executing in lockstep. In one embodiment, the continuously available execution environment may be implemented without recompilation of an operating system kernel. In one embodiment, the continuously available execution environment may be implemented without static recompilation of applications 104. In one embodiment, the continuously available execution environment may be implemented without modification of clients 110, and the failover 105 may be transparent to clients 110. The continuously available execution environment may also be used for migration of applications 104 from server to server (e.g., for maintenance or performance reasons).

In the example shown in FIG. 1, the multi-server networked environment 100 includes a storage device 130A coupled to a network 120. Various embodiments of the multi-server networked environments discussed herein may include various quantities and types of storage devices. Storage devices may include any of various types of storage devices including, but not limited to, storage systems such as RAID (Redundant Array of Independent Disks) systems, disk arrays, JBODs (Just a Bunch Of Disks, used to refer to disks that are not configured according to RAID), and other suitable storage devices.

In various embodiments, the network 120 may comprise any local area network (LAN) such as an intranet or any wide area network (WAN) such as the Internet. The network 120 may use a variety of wired or wireless connection media. Wired connection media may include, for example, Ethernet, Fiber Channel media, or another sufficiently fast connection media. Wireless connection media may include, for example, a satellite link, a modem link through a cellular service, or a wireless link such as Wi-Fi.

In various embodiments, the multi-server networked environment 100 may employ any of a number of commercially available software products for continuous availability, such as, for example, various products available from VERITAS Software Corporation (Mountain View, Calif.). The software products for continuous availability may be installed and executed on servers 102 which are coupled to the network 120. In one embodiment, the software products for continuous availability may operate transparently to the servers 102, and/or applications 104. In various embodiments, the multi-server networked environment 100 may also employ any of a number of commercially available software products for storage management, such as, for example, various products available from VERITAS Software Corporation (Mountain View, Calif.). The storage management software may provide functionality such as cluster management, volume management, storage virtualization, and/or file system management to organize data on one or more storage devices 130 and/or provide storage access to servers 102 and clients 110.

In one embodiment, FIG. 1 may illustrate a Network-Attached Storage (NAS) environment. In a NAS environment, storage devices 130 may be directly attached to a network 120 (such as a local area network) using standard network protocols and may serve files to consumers on the network 120. In one embodiment, FIG. 1 may illustrate a Storage Area Network (SAN) environment. The SAN environment may comprise a dedicated storage network in which servers 102 and subsystems (e.g., switches) collaborate to manage the movement and storage of data on storage devices 130. The hardware (e.g., switches, hubs, bridges, routers, cables, etc.) that connects servers 102 to storage devices 130 in a SAN is referred to as a "disk fabric" or "fabric." In a SAN environment, clients 110 may send data to and receive data from the servers 102 over a local area network instead of communicating directly with the storage devices 130. In one embodiment, FIG. 1 may illustrate a cluster file system environment. A cluster file system may enable concurrent file access to a single storage device 130 from multiple servers 102. Clusters may also provide high availability, load balancing, and/or parallel processing.

In order to capture the application state 103 at a point in time at or immediately prior to the point of failure, sufficient data about the application state 103 may be stored on a routine basis to enable deterministic and transparent restoration of the application state 103. The stored data may include, for example, various combinations of an application snapshot, a file system snapshot, and/or a log of events. FIG. 2 illustrates a multi-server networked environment 200 including failover based on capturing and restoring a file system snapshot, application snapshot, and log of events according to one embodiment. The application state 103C of a first instance 104C (e.g., on a first server 102C) may be preserved and then restored to a second instance 104D (e.g., on a second server 102D) using an application snapshot 132C, file system snapshot 133C, and log(s) 134C. The application snapshot 132C, file system snapshot 133C, and log(s) 134C may be stored on one or more storage devices (e.g., storage device 130B) which are accessible to both servers 102C, 102D.

The application snapshot 132C may comprise application state data such as the execution state, memory state, transaction state, open network connections, open files, and other suitable state-related data for the application instance 104C at a particular point in time. In one embodiment, an application snapshot may be generated at a regular interval (e.g., once per minute). Generation of the application snapshot may comprise freezing all application-related processes, draining I/O queues and buffers, taking a memory snapshot of all application-related processes, taking a memory snapshot of relevant kernel resources (e.g., open files, TCP endpoints, semaphores, etc.), storing the data to disk, and unfreezing the application. Further aspects regarding possible implementations of application snapshots are described in U.S. Pat. No. 6,848,106, which is incorporated herein by reference.

The multi-server networked environment 200 may include an application snapshot/restore framework which processes transactions between the operating system and the applications 104. In one embodiment, application states may be tracked via library and kernel interposition using the application snapshot/restore framework. Requests for system resources or changes to process state may be routed internally, and the application snapshot/restore framework may track these events in anticipation of an application snapshot 132C. The application snapshot/restore framework may be transparent to running (and snapshotted) applications 104 such that an application is always running from the application's perspective. An application snapshot 132C may comprise multiple processes and multiple threads and may include shared resources in use by a process, such as shared memory or semaphores. A process may be snapshotted and restored more than once. In one embodiment, all processes that are snapshotted together in the form of an application chain may share the same application ID ("AID"). As used herein, an application chain is the logical grouping of a set of applications and processes that communicate with each other and share resources to provide a common function.

In one embodiment, a virtual environment may comprise a layer that resides between the applications 104 and the operating system. Resource handles may be abstracted to present a consistent view to the application 104, but the actual system resource handles may change as an application is snapshotted or restored more than once. The virtual environment may also allow multiple applications to compete for the same resources, where exclusion might normally prohibit such behavior, to allow multiple snapshots to coexist without reconfiguration. The virtual environment may comprise a preload library which interposes between an application and the operating system for the purpose of intercepting and handling library calls and system calls. Once the library has been preloaded, it may be attached to the address space of a process. The preload library may operate in "user mode" (i.e., non-kernel and non-privileged mode). Application programming interface (API) calls to modify the state of the application may be made from the application 104 to the operating system API interfaces via the application snapshot/restore framework or the preload library. The preload library may save the state of various resources by intercepting API interface calls and then save the state at a pre-arranged memory location. When the memory of a process is saved as part of the snapshot/restore mechanism, this state may be saved since it resides in memory. The state may be saved to non-volatile storage (i.e., a file on disk). The preload library may notify the snapshot/restore framework through a private interface.

The file system snapshot 133C may comprise file system data or storage data such as contents and metadata of a file system at a particular point in time. The file system snapshot 133C may also be referred to as a "disk snapshot" or "frozen image." The file system represented by the file system snapshot may be used by the application instance 104C, e.g., for storage of application-related data. In one embodiment, a file system snapshot may be generated at a regular interval (e.g., once per minute). In one embodiment, the file system snapshot 133C may represent one or more file system snapshots for a plurality of file systems used by the application instance 104C. In one embodiment, the file system snapshot 133C may include only a relevant subset of any file system used by the application instance 104C, such as one or more specific volumes, directories, and/or files. Further aspects regarding possible implementations of file system snapshots are described in U.S. Pat. No. 6,850,945, which is incorporated herein by reference.

Because snapshots are too resource-intensive to be taken after every event that changes the application state 103C, one or more logs 134C may be used to store data between snapshots which alters the application state 103C. The log(s) 134C may comprise any events that are capable of introducing non-determinism into program execution, including their original sequence and original results. For example, a log 134C may comprise a record of events and results such as transaction requests from clients 110B of the application, interprocess communication events, TCP/IP events, other file I/O, system calls for random number generation, system calls for a date or time, attempts to acquire semaphores, signal execution, etc. In one embodiment, the log(s) 134C may comprise both synchronous and asynchronous events. After restoring the state-related data in the application snapshot 132C and the file system data in the file system snapshot 133C, the entries in the log 134C may be "replayed" (i.e., encountered in the same order and with the same results as originally experienced) to restore the application state 103C and continue execution from the point of failure. In one embodiment, replaying the log entries may comprise ensuring that function calls return the original value, that sequences produce the original result, that read operations return the original results of the original size, that signal execution occurs at the same location as in the original process, that semaphores are acquired in the original sequence, etc. To ensure the original results, replaying some log entries may therefore comprise simulating execution of particular events (e.g., through interception of kernel functions) rather than re-executing the events per se.

Figure 3:
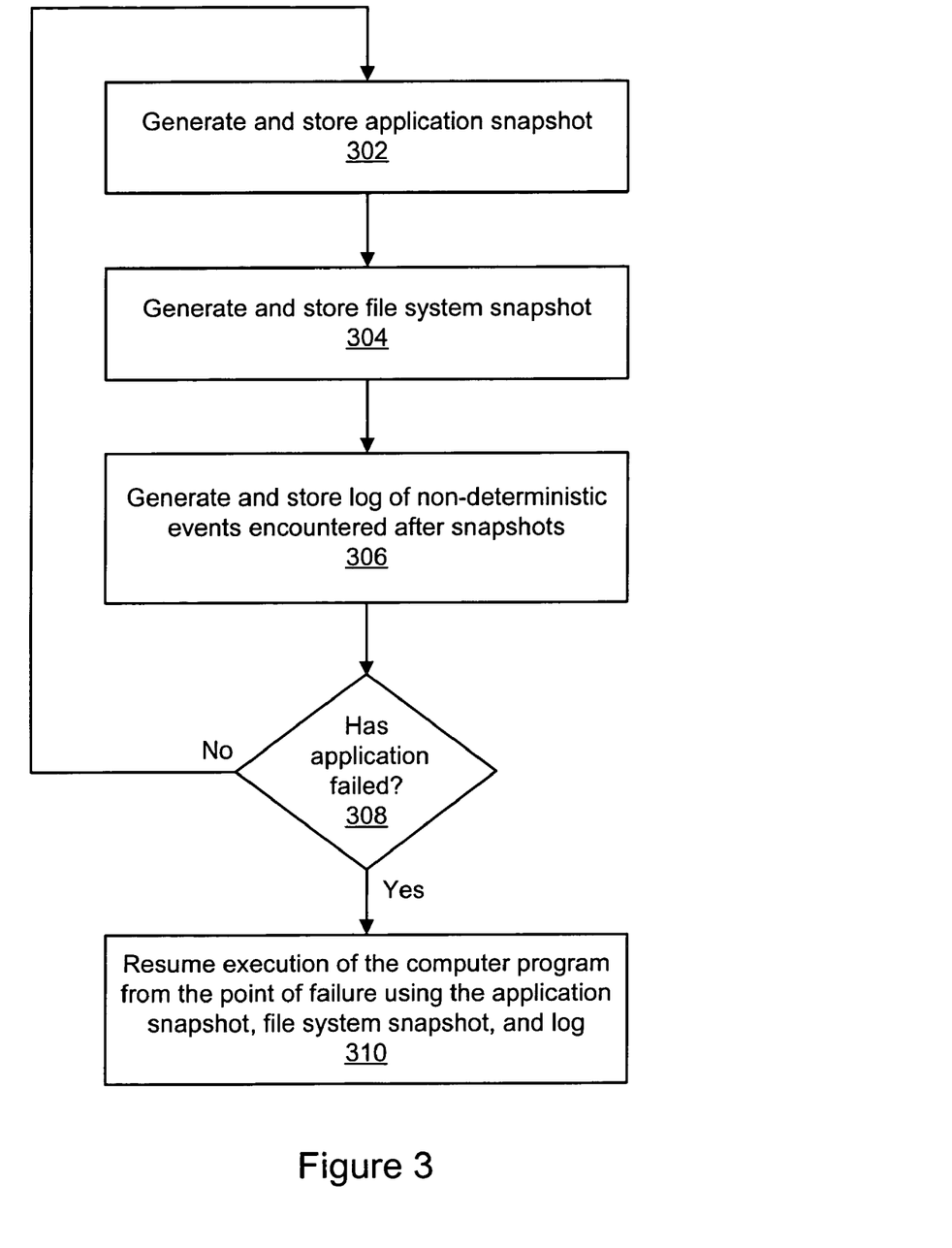
FIG. 3 is a flowchart illustrating a method for failover based on capturing and restoring a file system snapshot, application snapshot, and log of events according to one embodiment.

FIG. 3 is a flowchart illustrating a method for failover based on capturing and restoring a file system snapshot, application snapshot, and log of events according to one embodiment. In one embodiment, any of the steps 302 through 310 may be performed programmatically, i.e., by executing instructions on a computer system to implement the steps. In one embodiment, any of the steps 302 through 310 may be performed automatically, i.e., without user intervention.

In 302, an application snapshot may be generated and stored on a storage device as discussed above with respect to FIG. 2. In 304, a file system snapshot may be generated and stored on a storage device as discussed above with respect to FIG. 2. In 306, an event log may be generated and stored on a storage device as discussed above with respect to FIG. 2. The log may be continuously updated with new events between the generation of snapshots in 302 and 304. In one embodiment, an older application snapshot may be discarded after a new application snapshot is successfully generated and stored. Likewise, an older file system snapshot may be discarded after a new file system snapshot is successfully generated and stored. In one embodiment, an older log may be discarded after a new application snapshot and new file system snapshot are successfully generated and stored.

For purposes of illustration, steps 302 through 306 are depicted in a particular order. In other embodiments, steps 302, 304, and 306 may be performed in a different order than the order depicted in FIG. 3. For example, step 304 may be performed before step 302, or steps 302 and 304 may be performed substantially simultaneously. In one embodiment, steps 302 through 306 may be performed a plurality of times until a failure is detected in 308.

In 308, it may be determined that execution of the computer program 104 has failed on a server 102 at a particular point in time. Failure of the application instance 104 may be caused by a hardware or software fault in the server 102 itself or by a fault in an external entity such as a storage device. In one embodiment, the failure may be sensed automatically by another server 102 using conventional cluster management techniques. The failure may also be sensed by another element such as a client 110, a storage device 130, or another computer system tasked with oversight of the multi-server networked environment.

For purposes of illustration, the failure detection 308 is depicted in FIG. 3 as occurring after step 306. However, the failure detection 308 may occur at substantially any point between steps 302 through 310 in one embodiment. The failure detection 308 may also occur during any of steps 302, 304, or 306. In a common example, the failure may be detected while events are being logged in 306 in between the generation of the snapshots.

In 310, execution of the computer program may be resumed (e.g., on another server) from the particular point in time by restoring the application snapshot, file system snapshot, and log to another instance of the program. Execution of the application 104 may then continue from the point of failure.

The most recent valid application snapshot and the most recent valid file system snapshot may be restored. Restoring the application snapshot may comprise restoring the execution state, memory state, transaction state, open network connections, open files, and other suitable state-related data from the application snapshot to the context of another application instance (e.g., on another server). Restoring the file system snapshot may comprise restoring the contents and metadata of a file system used by the first application instance and captured in the file system snapshot to a storage device accessible to the new application instance. In various embodiments, the file system snapshot may be restored to a same storage device or a different storage device with respect to the location of the original file system. In one embodiment, restoring the file system snapshot may comprise restoring data and metadata to a storage stack comprising the second server, the target storage device, and/or a connectivity layers.

After restoring the snapshots, entries in the log may be replayed in the same order and with the same results as originally encountered to restore the application state 103 deterministically. Replaying the logged events to restore the application state 103 may comprise executing or simulating execution of the events in the same order and with the same results as originally detected and logged. After restoring the snapshots and the log, including the opening of connections to any clients 110, execution of the application 104 may continue in from a point in time at or immediately prior to the point of failure. In this manner, the failover 105 from one server to another server may be transparent to any clients 110. The clients 110B may be unaware of the failover from the first server to the second server, and the clients 110B may take no steps to resume the connections. In this manner, the failover 105 from one server to another server may be transparent to any clients 110.

In one embodiment, network connections between servers 102 and clients 110 may be virtualized through a network virtualization layer. The network virtualization layer may be present on any server 102 involved in the failover process. The network virtualization layer may provide servers with a virtual network address (e.g., a virtual IP address) which is mapped to an actual network address. Using the network virtualization layer, a network connection between a first server and a client may be transferred to and restored on a second server such that the client is unaware that a failover from the first server to the second server has taken place.

Although the generation of recurring application snapshots 132 is useful in implementing the continuously available execution environment, individual snapshots may impose an undesirable performance penalty on the application 104 and the monitored server 102. Using prior approaches, applications 104 were paused while their states 103 were captured and stored to disk. Using these prior approaches, an application snapshot 132 taken under typical operating conditions could take anywhere from several seconds to several minutes to complete, depending on factors such as the amount of application memory and the I/O complexity. During this time, the application 104 was unavailable to clients 110.

Using the systems, methods, and computer-accessible media described herein, recurring application snapshots may be generated in such a way that interruption of application execution is minimized. FIG. 4 illustrates a multi-server networked environment 400 including efficient generation of application snapshots 132 according to one embodiment. By manipulating the permissions 172E of memory pages 170E of application memory, an application 104 may be restarted quickly after generation of an application snapshot 132.

Figure 5:
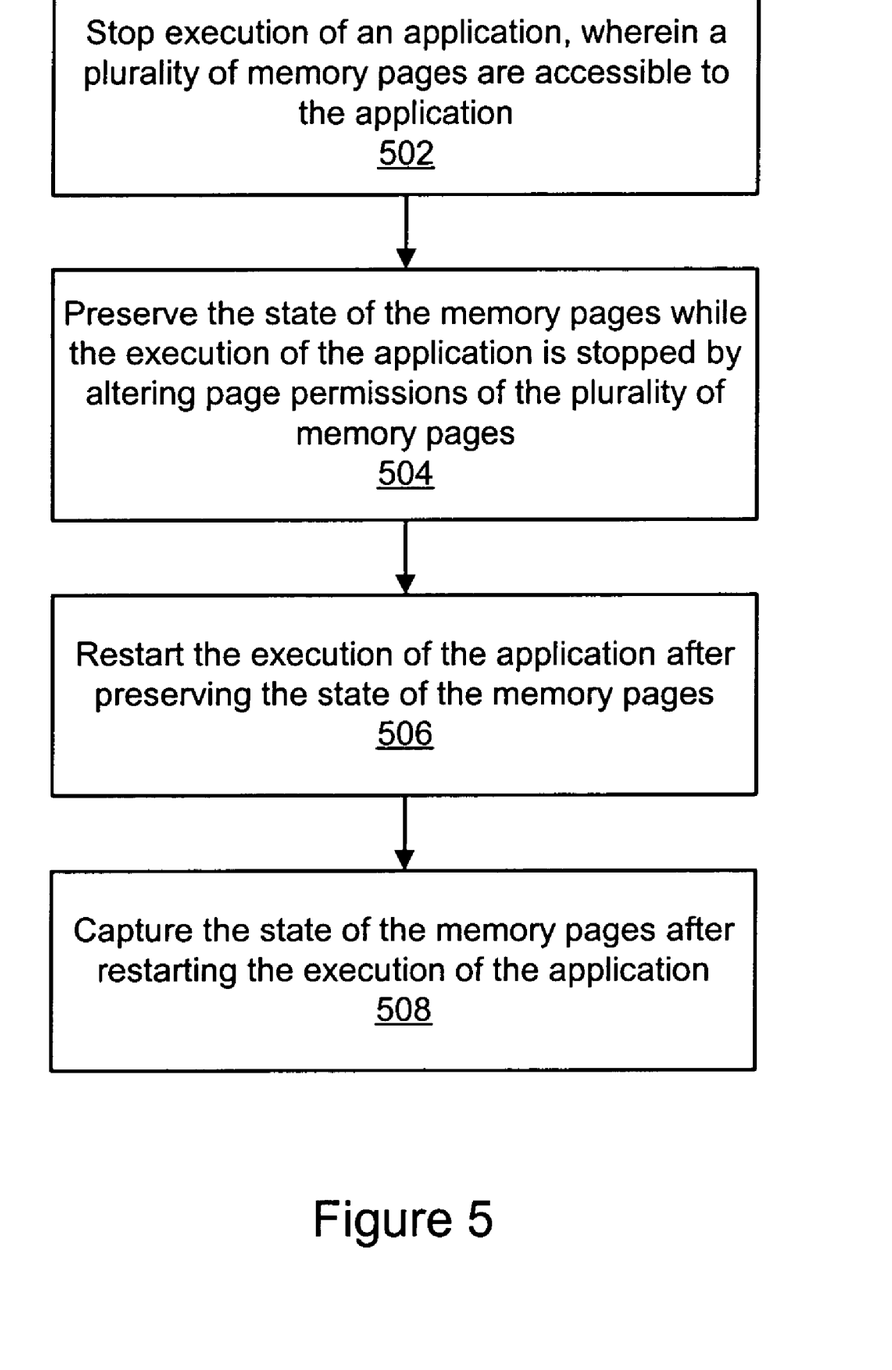
FIG. 5 is a flowchart illustrating a method for efficient generation of application snapshots according to one embodiment.

FIG. 5 is a flowchart illustrating a method for efficient generation of application snapshots according to one embodiment. In 502, execution of an application may be stopped in order for an application snapshot to be generated using the application snapshot/restore framework discussed with reference to FIG. 2. As discussed above, the application snapshot 132E may comprise application state data such as the execution state, memory state, transaction state, open network connections, open files, and other suitable state-related data for the application instance 104E at a particular point in time.

In one embodiment, application snapshots may be generated at a regular interval (e.g., once per minute).

The server 102E may include a paging mechanism for memory management. The paging mechanism may be implemented by a memory management unit (MMU) which divides available memory into a plurality of units called pages. The application memory (i.e., the memory accessible to the application 104E) may therefore include a plurality of pages. For purposes of example, one memory page 170E is illustrated in FIG. 4. However, it is contemplated that a typical application may have access to a large number of such pages. In 504, the state of the memory pages 170E may be preserved while the execution of the application is stopped by altering page permissions 172 of the memory pages 170E. The page permissions 172 may comprise read-only permissions, copy-on-write permissions, and/or other suitable flags or settings to preserve a snapshot of the relevant memory at a point in time while the application 104E is frozen. The exact flags and page modes of the paging mechanism may vary depending upon the processor or other hardware of the server 102E.

In 506, the execution of the application may be restarted after the state of the memory pages has been preserved. In this way, disruption of the application may be minimized. In one embodiment, the input/output (I/O) state of the application (e.g., connections with clients 110C) and other elements of the application state 103E not related to the memory 170E contents may be captured prior to restarting the execution of the application.

In 508, the state of the memory pages may be captured after the execution of the application has been restarted. Due to the alteration of the page permissions 172E in 504, the captured memory state reflects the state of the memory while the application was stopped. In one embodiment, the memory state may include the memory state of all application-related processes as well as relevant kernel resources (e.g., open files, TCP endpoints, semaphores, etc.). In one embodiment, the original page permissions of the memory pages 170E may be restored after the state of the memory pages has been captured.

The state of the memory pages may be stored on a storage device 130 as part of an application snapshot 132. As with the capturing of the memory state, the storing of the memory state to disk may also occur after the application instance 104E has resumed operation. As discussed above with reference to FIGS. 1-3, the execution of the application may be resumed (e.g., on a second server 102F) at a later point in time using the state of the memory pages, the I/O state, and other elements of the application snapshot 132E in conjunction with an event log 134E and/or a file system snapshot 133E.

Exemplary Computer Systems

FIG. 6 illustrates a block diagram of a typical computer system 900 for implementing embodiments of the systems and methods described above. Computer system 900 may be illustrative of a server 102, client 110, or storage device 130. As used herein, "computing device" is synonymous with "computer system." Computer system 900 includes a processor 910 and a memory 920 coupled by a communications bus. Processor 910 can be a single processor or a number of individual processors working together. Memory 920 is typically random access memory (RAM), or some other dynamic storage device, and is capable of storing instructions to be executed by the processor, e.g., continuous availability software 940. Memory 920 is also used for storing temporary variables or other intermediate information during the execution of instructions by the processor 910.

Computer system 900 may also include devices such as keyboard & mouse 950, SCSI interface 952, network interface 954, graphics & display 956, hard disk 958, and other nonvolatile storage 960, all of which are coupled to processor 910 by a communications bus. In various embodiments, nonvolatile storage 960 may include optical media devices such as read-only or writable CD or DVD, solid-state devices such as nonvolatile RAM, or any other suitable type of nonvolatile storage. It will be apparent to those having ordinary skill in the art that computer system 900 can also include numerous elements not shown in the figure, such as additional storage devices, communications devices, input devices, and output devices, as illustrated by the ellipsis shown. An example of such an additional computer system device is a Fibre Channel interface.

Those having ordinary skill in the art will readily recognize that the techniques and methods discussed above can be implemented in software as one or more software programs, using a variety of computer languages, including, for example, traditional computer languages such as assembly language, Pascal, and C; object oriented languages such as C++ and Java; and scripting languages such as Perl and Tcl/Tk. In some embodiments, software 940 may comprise program instructions executable, for example by one or more processors 910, to perform any of the functions or methods described above. Also, in some embodiments software 940 can be provided to the computer system via a variety of computer-accessible storage media including electronic media (e.g., flash memory), magnetic storage media (e.g., hard disk 958, a floppy disk, etc.), and optical storage media (e.g., CD-ROM 960). In some embodiments software 940 can be provided to the computer system via communications media conveying signals encoding the instructions (e.g., via a network coupled to network interface 954). In some embodiments, separate instances of these programs can be executed on separate computer systems in keeping with the methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computer systems with variations in, for example, the number of nodes, the type of operation of the computer system, e.g., cluster operation (failover, parallel, etc.), the number and type of shared data resources, and the number of paths between nodes and shared data resources.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method comprising:
   stopping execution of an application, wherein a plurality of memory pages are accessible to the application;
   preserving a state of the plurality of memory pages while the execution of the application is stopped by altering page permissions of the plurality of memory pages;
   restarting the execution of the application after preserving the state of the plurality of memory pages;

capturing the state of the plurality of memory pages after restarting the execution of the application;

logging one or more events affecting the state of the plurality of memory pages and occurring after restarting the execution of the application, wherein the one or more logged events include one or more network events and one or more attempts to acquire a semaphore, wherein the one or more attempts to acquire the semaphore include at least one unsuccessful attempt and wherein logging the one or more events comprises storing a respective result of each of the one or more events, wherein the stored results include the result of the at least one unsuccessful attempt; and resuming the execution of the application after a point of failure in the execution of the application by restoring the captured state of the plurality of memory pages and replaying the one or more logged events, wherein replaying the one or more logged events comprises regenerating the respective result of each of the one or more logged events, wherein the regenerated results include the result of the at least one unsuccessful attempt.

2. The method of claim 1,
wherein the page permissions comprise read-only permissions.

3. The method of claim 1,
wherein the page permissions comprise copy-on-write permissions.

4. The method of claim 1, further comprising:
restoring original page permissions of the plurality of memory pages after capturing the state of the plurality of memory pages.

5. The method of claim 1, further comprising:
capturing an input/output (I/O) state of the application prior to restarting the execution of the application.

6. The method of claim 5, further comprising:
resuming the execution of the application using the state of the plurality of memory pages and the I/O state.

7. The method of claim 1, further comprising:
storing the state of the plurality of memory pages on a storage device.

8. A computer-accessible storage medium comprising program instructions, stored thereon, wherein the program instructions are computer-executable to implement steps comprising:

stopping execution of an application, wherein a plurality of memory pages are accessible to the application;

preserving a state of the plurality of memory pages while the execution of the application is stopped by altering page permissions of the plurality of memory pages;

restarting the execution of the application after preserving the state of the plurality of memory pages;

capturing the state of the plurality of memory pages after restarting the execution of the application;

logging one or more events affecting the state of the plurality of memory pages and occurring after restarting the execution of the application, wherein the one or more logged events include one or more network events and one or more attempts to acquire a semaphore, wherein the one or more attempts to acquire the semaphore include at least one unsuccessful attempt and wherein logging the one or more events comprises storing a respective result of each of the one or more events, wherein the stored results include the result of the at least one unsuccessful attempt; and resuming the execution of the application after a point of failure in the execution of the application by restoring the captured state of the plurality of memory pages and replaying the one or more logged events, wherein replaying the one or more logged events comprises regenerating the respective result of each of the one or more logged events wherein the regenerated results include the result of the at least one unsuccessful attempt.

9. The computer-accessible storage medium of claim 8,
wherein the page permissions comprise read-only permissions.

10. The computer-accessible memory medium of claim 8,
wherein the page permissions comprise copy-on-write permissions.

11. The computer-accessible storage medium of claim 8, wherein the program instructions are further computer-executable to implement:
restoring original page permissions of the plurality of memory pages after capturing the state of the plurality of memory pages.

12. The computer-accessible storage medium of claim 8, wherein the program instructions are further computer-executable to implement:
capturing an input/output (I/O) state of the application prior to restarting the execution of the application.

13. The computer-accessible storage medium of claim 12, wherein the program instructions are further computer-executable to implement:
resuming the execution of the application using the state of the plurality of memory pages and the I/O state.

14. A system comprising:
a processor; and
a memory coupled to the processor, wherein the memory comprises a plurality of memory pages, and wherein the memory stores program instructions which are executable by the processor to:

stop execution of an application, wherein the plurality of memory pages are accessible to the application;

preserve a state of the plurality of memory pages while the execution of the application is stopped by altering page permissions of the plurality of memory pages;

restart the execution of the application after preserving the state of the plurality of memory pages;

capture the state of the plurality of memory pages after restarting the execution of the application;

log one or more events affecting the state of the plurality of memory pages and occurring after restarting the execution of the application, wherein the one or more logged events include one or more network events and one or more attempts to acquire a semaphore, wherein the one or more attempts to acquire the semaphore include at least one unsuccessful attempt, and wherein logging the one or more events comprises storing a respective result of each of the one or more events, wherein the stored results include the result of the at least one unsuccessful attempt; and resume the execution of the application after a point of failure in the execution of the application by restoring the captured state of the plurality of memory pages and replaying the one or more logged events, wherein replaying the one or more logged events comprises regenerating the respective result of each of the one or more logged events, wherein the regenerated results include the result of the at least one unsuccessful attempt.

15. The system of claim 14,
wherein the page permissions comprise read-only permissions.

16. The system of claim 14, wherein the page permissions comprise copy-on-write permissions.

17. The system of claim 14, wherein the program instructions are further executable by the processor to:
restore original page permissions of the plurality of memory pages after capturing the state of the plurality of memory pages.

18. The system of claim 14, wherein the program instructions are further executable by the processor to:
capture an input/output (I/O) state of the application prior to restarting the execution of the application.

19. The system of claim 18, wherein the program instructions are further executable by the processor to:
resume the execution of the application using the state of the plurality of memory pages and the I/O state.

20. A system comprising:
a memory comprising a plurality of memory pages;
means for stopping execution of an application, wherein the plurality of memory pages are accessible to the application;
means for preserving a state of the plurality of memory pages while the execution of the application is stopped by altering page permissions of the plurality of memory pages;
means for restarting the execution of the application after preserving the state of the plurality of memory pages;
means for capturing the state of the plurality of memory pages after restarting the execution of the application;
means for logging one or more events affecting the state of the plurality of memory pages and occurring after restarting the execution of the application, wherein the one or more logged events include one or more network events and one or more attempts to acquire a semaphore, wherein the one or more attempts to acquire the semaphore include at least one unsuccessful attempt, and wherein logging the one or more events comprises storing a respective result of each of the one or more events, wherein the stored results include the result of the at least one unsuccessful attempt; and
means for resuming the execution of the application after a point of failure in the execution of the application by restoring the captured state of the plurality of memory pages and replaying the one or more logged events, wherein replaying the one or more logged events comprises regenerating the respective result of each of the one or more logged events, wherein the regenerated results include the result of the at least one unsuccessful attempt.

\* \* \* \* \*